United States Patent
Pritchard

(10) Patent No.: US 10,232,707 B2
(45) Date of Patent: Mar. 19, 2019

(54) HYDRAULICALLY ACTUATED POWER TRANSFER UNIT

(71) Applicant: BorgWarner Inc., Auburn Hills, MI (US)

(72) Inventor: Larry A. Pritchard, Macomb, MI (US)

(73) Assignee: BorgWarner Inc., Auburn Hills, MI (US)

(*) Notice: Subject to any disclaimer, the term of this patent is extended or adjusted under 35 U.S.C. 154(b) by 696 days.

(21) Appl. No.: 14/839,329

(22) Filed: Aug. 28, 2015

(65) Prior Publication Data

US 2016/0114680 A1  Apr. 28, 2016

Related U.S. Application Data

(60) Provisional application No. 62/069,047, filed on Oct. 27, 2014.

(51) Int. Cl.
| | |
|---|---|
| *B60K 17/34* | (2006.01) |
| *B60K 5/04* | (2006.01) |
| *B60K 17/342* | (2006.01) |
| *B60K 17/344* | (2006.01) |
| *B60K 17/35* | (2006.01) |
| *F16H 57/04* | (2010.01) |

(52) U.S. Cl.
CPC .......... *B60K 17/34* (2013.01); *B60K 5/04* (2013.01); *B60K 17/342* (2013.01); *B60K 17/344* (2013.01); *B60K 17/35* (2013.01); *F16H 57/0441* (2013.01); *B60Y 2306/03* (2013.01)

(58) Field of Classification Search
CPC .......................... B60K 17/34; F16H 57/0445
USPC .......................................................... 180/233
See application file for complete search history.

(56) References Cited

U.S. PATENT DOCUMENTS

| | | | |
|---|---|---|---|
| 2,182,948 A | 12/1939 | Schjolin | |
| 4,459,874 A * | 7/1984 | Suzuki ................. | B60K 17/344 74/745 |
| 5,176,039 A * | 1/1993 | Takeuchi ............ | F16H 57/0447 74/467 |
| 5,218,886 A | 6/1993 | Louis et al. | |
| 7,210,565 B2 | 5/2007 | Yamazaki et al. | |
| 7,410,349 B2 * | 8/2008 | Ronk ...................... | F04C 2/102 418/135 |
| 8,474,349 B2 | 7/2013 | Grogg et al. | |
| 8,584,786 B2 | 11/2013 | Grogg | |
| 8,763,777 B2 | 7/2014 | Burns et al. | |
| 2004/0000450 A1* | 1/2004 | Fabry ..................... | B62D 11/16 184/6.12 |
| 2005/0217921 A1* | 10/2005 | Mori ...................... | B60K 17/35 180/433 |
| 2007/0137966 A1 | 6/2007 | Francis et al. | |

(Continued)

*Primary Examiner* — Joseph M Rocca
*Assistant Examiner* — Conan D Duda
(74) *Attorney, Agent, or Firm* — Young Basile Hanlon & MacFarlane, P.C.

(57) ABSTRACT

A power transfer unit for an all-wheel drive drivetrain that includes an engine, a transmission having a pump for circulating hydraulic fluid from a sump, and a driveshaft. The power transfer unit includes an input for receiving driving power from the transmission, an output for delivering driving power to the driveshaft, a first clutch, a first fluid supply path for delivering the hydraulic fluid from the pump to the first clutch, and a fluid return path for returning the hydraulic fluid from the power transfer unit to the sump of the transmission.

13 Claims, 3 Drawing Sheets

(56) References Cited

U.S. PATENT DOCUMENTS

| | | | |
|---|---|---|---|
| 2008/0046158 A1* | 2/2008 | Carey | B60K 23/0808 |
| | | | 701/51 |
| 2008/0178829 A1* | 7/2008 | Ochiai | F01L 1/022 |
| | | | 123/90.27 |
| 2009/0288929 A1* | 11/2009 | Sandstrom | B60W 10/119 |
| | | | 192/58.2 |
| 2010/0004088 A1* | 1/2010 | Wenthen | F16H 37/046 |
| | | | 475/204 |
| 2010/0093477 A1* | 4/2010 | Foster | B60K 6/365 |
| | | | 475/116 |
| 2012/0238395 A1 | 9/2012 | Peura et al. | |
| 2014/0165755 A1* | 6/2014 | Morris | F16H 3/006 |
| | | | 74/330 |
| 2014/0335995 A1* | 11/2014 | Swales | B60W 20/00 |
| | | | 477/3 |
| 2015/0267761 A1* | 9/2015 | Yoshimura | F16D 13/52 |
| | | | 180/249 |
| 2015/0314679 A1* | 11/2015 | Rode | B60K 23/08 |
| | | | 180/233 |
| 2016/0144864 A1* | 5/2016 | Deutsch | F16H 57/0435 |
| | | | 475/127 |

* cited by examiner

HYDRAULICALLY ACTUATED POWER TRANSFER UNIT

CROSS-REFERENCE TO RELATED APPLICATIONS

This application claims the benefit of U.S. Provisional Application No. 62/069,047, which was filed on Oct. 27, 2014.

BACKGROUND

All-wheel drive drivetrains for vehicles allow driving power to be delivered to all four wheels of the vehicle. By delivering driving power to all four wheels, vehicle performance is improved when surface conditions are poor. As examples, all-wheel drive systems can improve vehicle performance when road surfaces are slippery as a result of rain or snow, and when the road surface itself is of poor quality, such as dirt or gravel road surfaces.

In all wheel-drive vehicles with a transversely mounted front-engine layout, a transaxle is typically utilized to provide a desired gear ratio and to distribute driving power to the left and right front wheels by way of a front differential and a front axle. A power transfer unit receives driving power from the front axle and transfers driving power to the rear wheels of the vehicle by way of a driveshaft, a rear differential, and a rear axle. In some implementations, the power transfer unit is configured to disconnect the power transfer path to the rear wheels. Conventionally, the power transfer unit is sealed with respect to the transaxle because the fluids utilized are different. For instance, an automatic transaxle is typically operated by and lubricated with hydraulic fluid (i.e. automatic transmission fluid) while the power transfer unit is lubricated by gear oil that has a much higher viscosity than conventional hydraulic fluid. Thus, the actuation and fluid management systems of a conventional power transfer unit are separate from those of a conventional transmission.

SUMMARY

One aspect of the disclosed embodiments is a power transfer unit for an all-wheel drive drivetrain that includes an engine, a transmission having a pump for circulating hydraulic fluid from a sump, and a driveshaft. The power transfer unit includes an input for receiving driving power from the transmission, an output for delivering driving power to the driveshaft, a first clutch, a first fluid supply path for delivering the hydraulic fluid from the pump to the first clutch, and a fluid return path for returning the hydraulic fluid from the power transfer unit to the sump of the transmission.

Another aspect of the disclosed embodiments is a drivetrain for an all-wheel drive vehicle. The drivetrain includes an internal combustion engine and a transmission having a pump for circulating hydraulic fluid from a sump. The pump and the sump are disposed within the transmission. The transmission is a transaxle that includes a front differential that delivers driving power to a pair of front wheels. A rear differential gear set is connected to a driveshaft and delivers driving power to a pair of rear wheels. A power transfer unit includes a first clutch for disconnecting supply of driving power from the transmission to the driveshaft and a second clutch that controls a ratio of front-to-rear power distribution. The first clutch and the second clutch are each hydraulically actuated using the hydraulic fluid from the pump. The drivetrain includes a first fluid supply path for delivering the hydraulic fluid to the first clutch of the power transfer unit, a second fluid supply path for delivering the hydraulic fluid from the pump to the second clutch of the power transfer unit, and a fluid return path for returning the hydraulic fluid from the power transfer unit to the sump.

BRIEF DESCRIPTION OF THE DRAWINGS

The description herein makes reference to the accompanying drawings, wherein like reference numerals refer to like parts throughout several views, and wherein.

DETAILED DESCRIPTION

The disclosure herein is directed to a power transfer unit that receives pressurized working fluid from a fluid pump of a transmission and returns the working fluid to a shared sump within the transmission for use by the fluid pump of the transmission. The pressurized working fluid is utilized to actuate at least one clutch of the power transfer unit and to lubricate the gears and other components of the power transfer unit. The disclosure herein is also directed to vehicle drivetrains that incorporate the power transfer unit.

Figure 1:
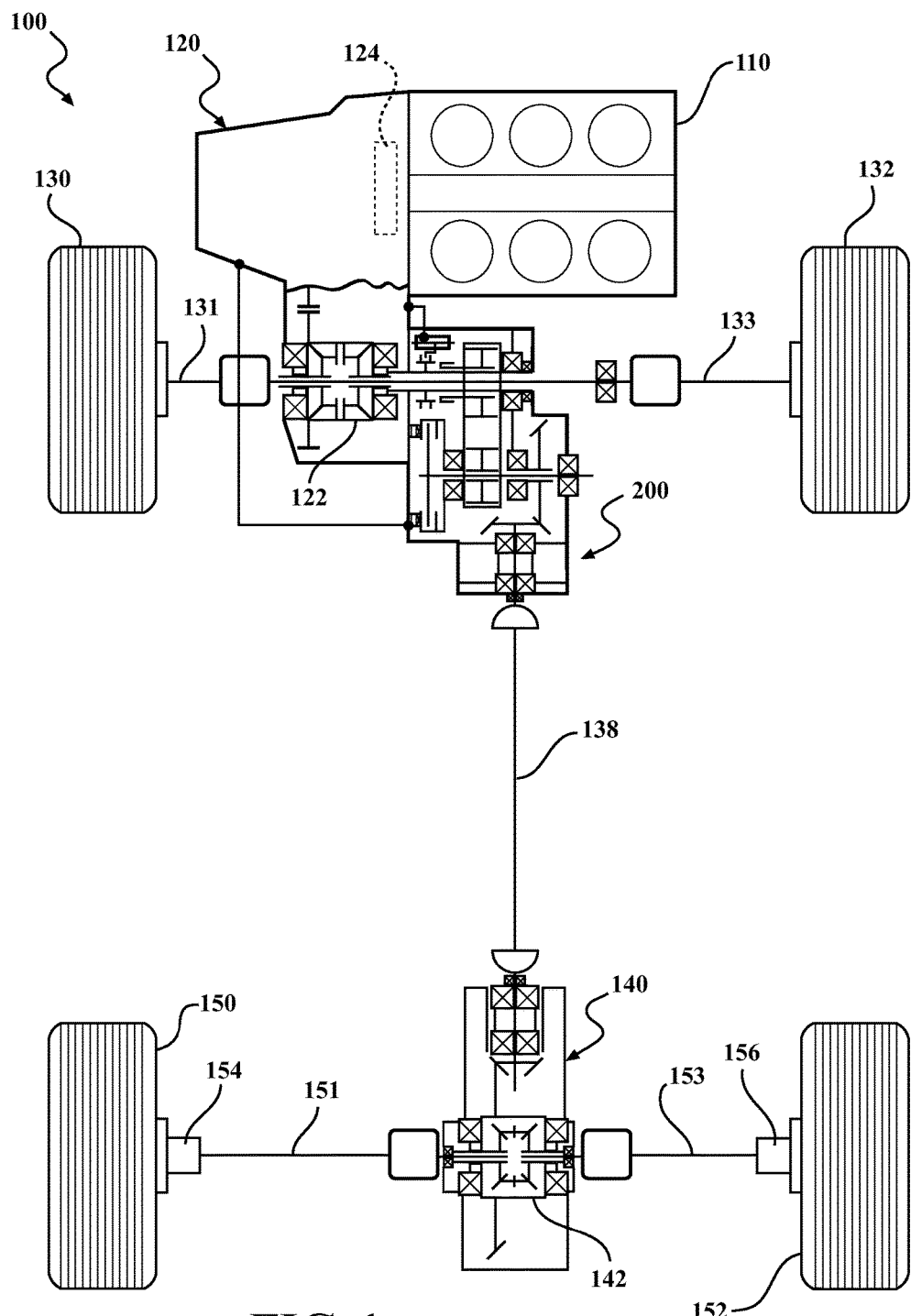
FIG. 1 is a top down view schematic diagram of a drivetrain of an all-wheel drive vehicle.

FIG. 1 shows a drivetrain 100 for an all-wheel drive vehicle. An engine 110 of the drivetrain 100 is an internal combustion engine that is transversely mounted with respect to the vehicle in a front-engine configuration. The drivetrain 100 also includes a transmission 120, a power transfer unit 200, and a rear drive unit 140.

The transmission 120 receives driving power from the engine 110 and supplies driving power at a desired gear ratio. In the illustrated example, the transmission 120 is a transaxle, and thus supplies the driving power to a front differential 122 that is included in the transmission 120. The front differential 122 provides driving power to a front left wheel 130 and a front right wheel 132 by way of a front left axle shaft 131 and a front right axle shaft 133. The transmission 120 also includes a pump 124 that is operable to pressurize a working fluid of the transmission 120, such as hydraulic fluid (e.g., automatic transmission fluid). The pump 124 is powered by the driving power that is received at the transmission 120 from the engine 110.

The transmission 120 is also operable to supply driving power to the power transfer unit 200. As will be explained further herein, the power transfer unit 200 is operable to connect and disconnect the driving power supplied by the transmission 120 to a driveshaft 138.

The driveshaft 138 is connected to the rear drive unit 140, which includes a rear differential gear set 142. The rear differential gear set 142 is operable to receive the driving power from the driveshaft 138 and supply the driving power to a rear left wheel 150 and a rear right wheel 152 by way of a rear left axle shaft 151 and a rear right axle shaft 153. The rear left axle shaft 151 and the rear right axle shaft 153 are connected to the rear left wheel 150 and the rear right wheel 152, respectively, by a left rear disconnect device 154 and a right rear disconnect device 156. The left rear disconnect device 154 and the right rear disconnect device 156 are any manner of device that is operable to disconnect supply of driving power from the rear left axle shaft 151 and the rear right axle shaft 153 to the rear left wheel 150 and the rear right wheel 152, respectively. For example, the left rear disconnect device 154 and the right rear disconnect device 156 can be electrically actuated or hydraulically actuated clutches.

Figure 2:
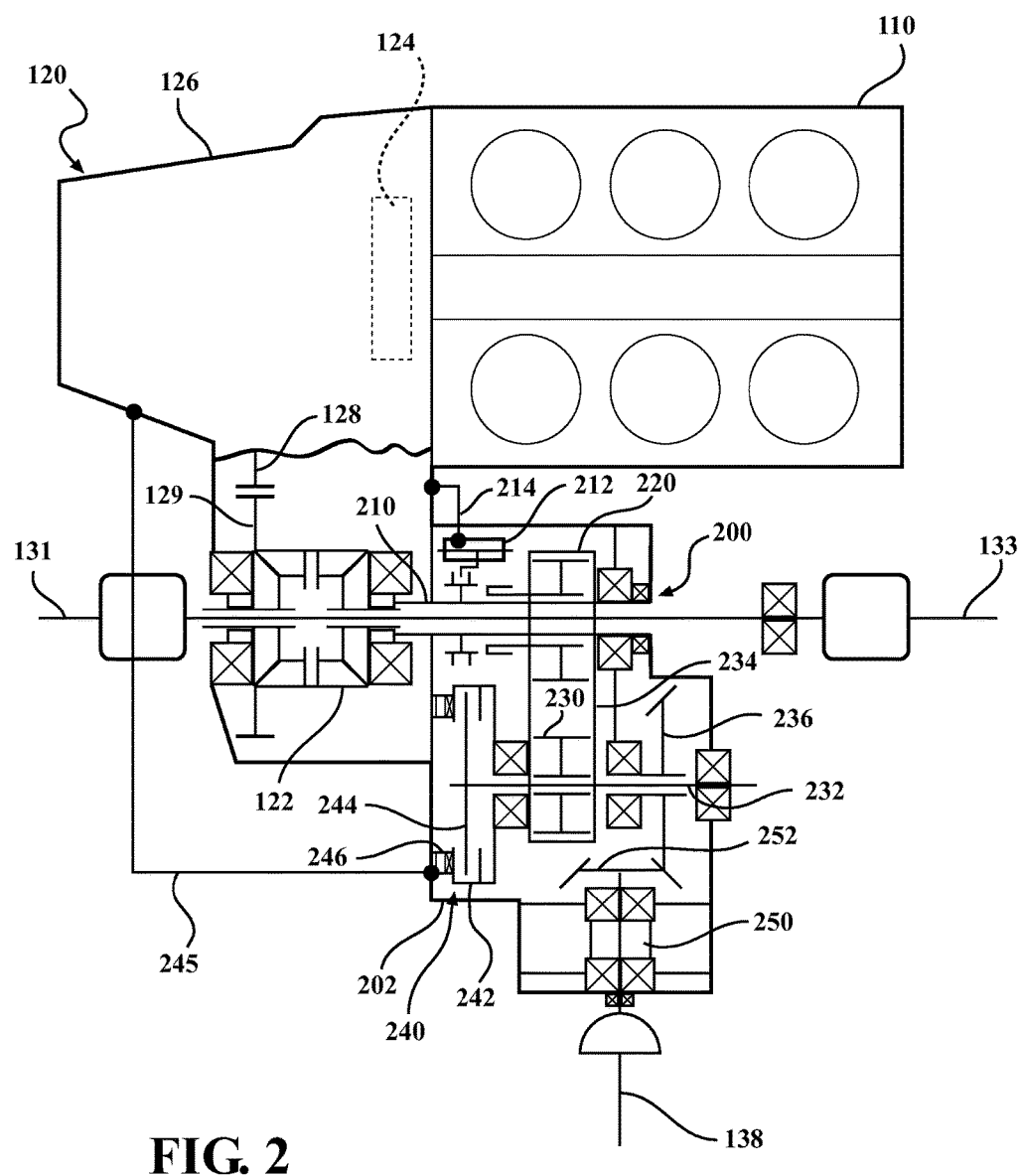
FIG. 2 is a detail schematic diagram showing an engine, a transmission, and a power transfer unit of the drivetrain of FIG. 1.

As shown in FIG. 2, the front differential 122 is disposed within a housing 126 of the transmission 120. The transmission 120 includes conventional components such as planetary gear sets that deliver driving power at a desired gear ratio to an output gear 128. The output gear 128 is engaged with a front differential input gear 129 in order to supply the driving power to the front differential 122. The front differential 122 is conventional in nature and distributes the driving power to the front left axle shaft 131, the front right axle shaft 133, and an input shaft 210 of the power transfer unit 200.

The input shaft 210 is an input part of the power transfer unit 200 for receiving driving power from the transmission 120. The input shaft 210 and the front right axle shaft 133 can be arranged concentrically, with the input shaft 210 being a hollow tubular member and the front right axle shaft 133 passing through the input shaft 210. Different configurations can be utilized for the input shaft 210 and the front right axle shaft 133. For example, the front right axle shaft 133 can be a multiple piece member, and/or the front right axle shaft 133 could be driven by the input shaft 210 without being directly connected to the front differential 122.

The power transfer unit 200 includes a disconnect clutch 212. The disconnect clutch 212 allows the power transfer unit 200 to be connected and disconnected from the input shaft 210, according to the desired driving mode of the vehicle. For example, in a two-wheel drive driving mode, the disconnect clutch 212 is in a disconnected position in which the driving power from the input shaft 210 is not transferred to the driveshaft 138 via the power transfer unit 200. When the disconnect clutch 212 moves to a connected position, the driving power from the input shaft 210 causes rotation of the driveshaft 138 via the power transfer unit 200, as will be explained further herein.

The disconnect clutch 212 is a hydraulically actuated clutch that receives pressurized working fluid from the pump 124 of the transmission 120 by way of a first fluid supply path 214. As one example, the first fluid supply path 214 can be a fluid line that is connected to a pressurized fluid supply port on the housing 126 of the transmission 120, as well as to a port on a housing 202 of the power transfer unit 200. The disconnect clutch 212 can move between the connected position and the disconnected position in response to the fluid pressure supplied by the first fluid supply path 214. As one example, the disconnect clutch 212 can be a dog clutch. As another example, the disconnect clutch 212 can be a synchronizer clutch.

The power transfer unit 200 includes a first sprocket 220 that is arranged on the input shaft 210 and a second sprocket 230 that is arranged on an intermediate shaft 232. Rotation of the first sprocket 220 causes rotation of the second sprocket 230. For example, the first sprocket 220 can be connected to the second sprocket 230 by a belt or a chain 234. The first sprocket 220 and the second sprocket 230 are only driven when the disconnect clutch 212 is in the connected position. In particular, when the disconnect clutch 212 is in the disconnected position, it does not engage the first sprocket 220, and rotation of the input shaft 210 does not cause rotation of the first sprocket 220. As an example, this can be achieved by mounting the first sprocket 220 to the input shaft 210 using bearings. When the disconnect clutch 212 is in the connected position, the first sprocket 220 rotates in unison with the input shaft 210, with the power being delivered from the input shaft 210 to the first sprocket 220 by the disconnect clutch 212.

The power transfer unit 200 can include a friction clutch 240. The friction clutch 240 is disposed within the housing 202 of the power transfer unit 200 and is operated to set a desired ratio of front-to-rear power distribution between the front wheels 130, 132 of the vehicle and the rear wheels 150, 152 of the vehicle. The friction clutch 240 includes a first clutch part 242 and a second clutch part 244. The first clutch part 242 is arranged on the intermediate shaft 232 and is coupled to the second sprocket 230 for rotation in unison with the second sprocket 230. The second clutch part 244 is coupled to the intermediate shaft 232 for rotation in unison with the intermediate shaft 232. The first clutch part 242 and the second clutch part 244 are movable between a fully connected position in which the first clutch part 242 and the second clutch part 244 rotate in unison and a fully disconnected position in which rotation of the first clutch part 242 does not cause rotation of the second clutch part 244. Between the fully connected position and the fully disconnected position of the first clutch part 242 and the second clutch part 244, the friction clutch 240 is able to transfer some of the power from the second sprocket 230 to the intermediate shaft 232 by way of slipping engagement of the first clutch part 242 with respect to the second clutch part 244. The degree of engagement of the first clutch part 242 with respect to the second clutch part 244 is controlled by a hydraulic actuator 246. The hydraulic actuator 246 is operable to cause engagement of the first clutch part 242 with respect to the second clutch part 244 by applying fluid pressure to the first clutch part 242 and/or the second clutch part 244. The hydraulic actuator 246 receives pressurized working fluid from the transmission 120 by way of a second fluid supply path 245, which is similar to the first fluid supply path 214, as previously described.

The driving power that is received by the intermediate shaft 232 is transferred to an output shaft 250. The output shaft 250 serves as a rotational output of the power transfer unit 200 that delivers driving power to the driveshaft 138. The driving power can be transferred from the intermediate shaft 232 to the output shaft 250 by one or more gears, such as a first bevel gear 236 that is arranged on the intermediate shaft 232 for rotation in unison with the intermediate shaft 232 and by a second bevel gear 252 that is arranged on the output shaft 250 and connected to the output shaft 250 rotation in unison therewith. The output shaft 250 is coupled to the driveshaft 138 for rotating the driveshaft 138.

In addition to actuating the disconnect clutch 212 and the friction clutch 240, the pressurized fluid that is supplied by way of the first fluid supply path 214 and the second fluid supply path 245 can also be provided to the internal components of the power transfer unit 200 for lubricating the power transfer unit 200. For example, the pressurized fluid can be routed through channels that are formed in the housing 202 of the power transfer unit and used to lubricate the input shaft 210, the intermediate shaft 232, the output shaft 250, and all components that are arranged on, connected to, or associated with the input shaft 210, the intermediate shaft 232, and the output shaft 250.

Figure 3:
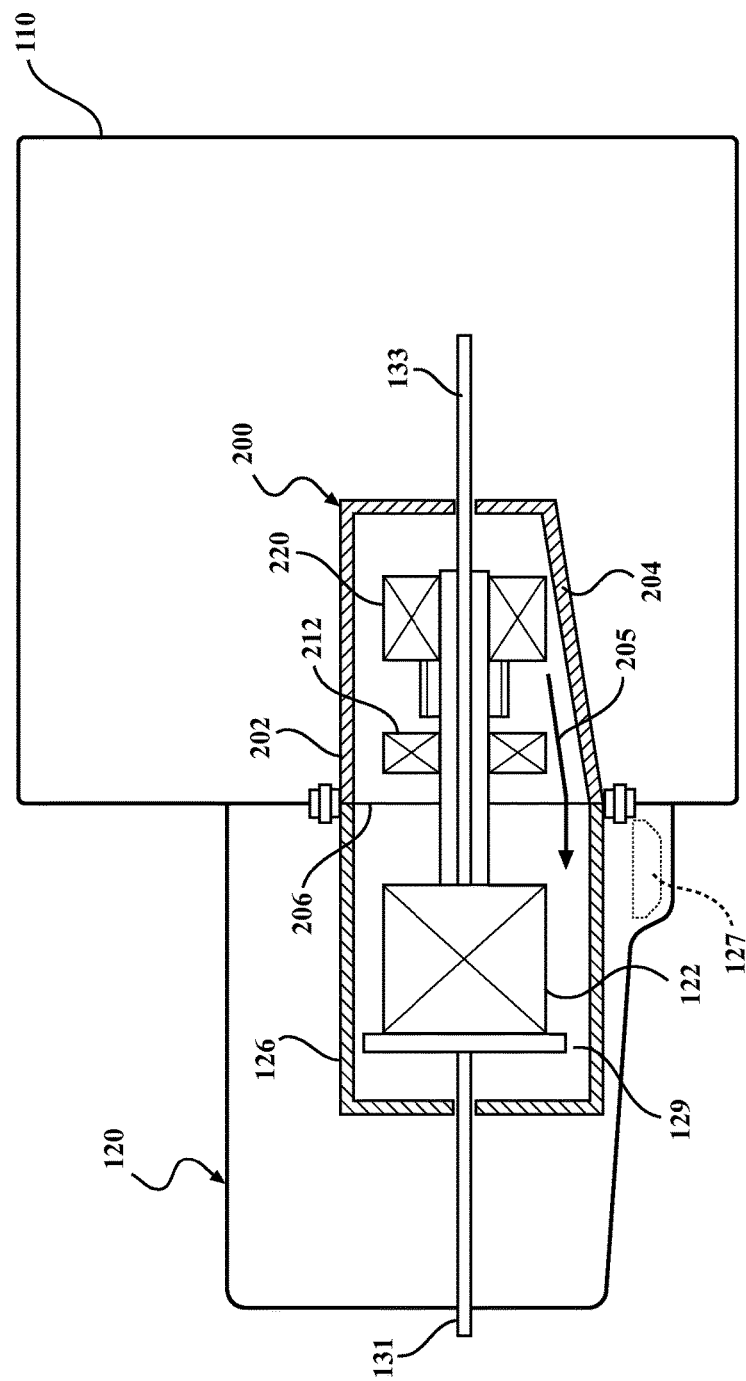
FIG. 3 is a rear view schematic diagram showing the engine, the transmission, and the power transfer unit.

The pressurized working fluid that is supplied to the power transfer unit 200 by the first fluid supply path 214 and the second fluid supply path 245 is retained within the housing 202 of the power transfer unit and drains to a bottom surface 204 of the power transfer unit 200, as shown in FIG. 3. The bottom surface 204 of the housing 202 of the power transfer unit 200 defines a fluid return path 205 by which the working fluid is returned to a sump 127 of the transmission 120. For example, the bottom surface 204 of the housing 202 can simply define a slope that directs the fluid toward an interface 206 of the power transfer unit 200 with respect to the transmission 120. At the interface 206, the housing 202 of the power transfer unit 200 and the housing 126 of the transmission 120 can define complementary openings, ports, channels, or other means of communicating fluid from the power transfer unit 200 to the transmission 120. In some implementations, the interior of the transmission 120 is not sealed with respect to the interior of the power transfer unit 200. In other implementations, the interior of the transmission 120 is sealed with respect to the interior of the power transfer unit 200, except at a port, fluid line, or other fluid communication path that defines the fluid return path for the working fluid to the sump 127. Once the fluid enters the transmission 120, the internal geometry of the transmission 120 directs the fluid toward the sump 127, where it is available to be utilized by the pump 124 of the transmission 120.

While the disclosure has been made in connection with what is presently considered to be the most practical and preferred embodiment, it should be understood that the disclosure is intended to cover various modifications and equivalent arrangements.

The invention claimed is:

1. A power transfer unit (200) for an all-wheel drive drivetrain (100) that includes an engine (110), a transmission (120) having a pump (124) for circulating hydraulic fluid from a sump (127), and a driveshaft (138), the power transfer unit (200) comprising:
   an input (210) for receiving driving power from the transmission (120);
   an output (250) for delivering driving power to the driveshaft (138);
   a first clutch (212);
   a first fluid supply path (214) for delivering the hydraulic fluid from the pump (124) to the first clutch (212);
   a fluid return path (205) for returning the hydraulic fluid from the power transfer unit (200) to the sump (127) of the transmission (120);
   a second clutch (240) that controls a ratio of front-to-rear power distribution; and
   a second fluid supply path (245) for delivering the hydraulic fluid from the pump (124) to the second clutch (240).

2. The power transfer unit (200) of claim 1, wherein the first clutch (212) is operable to disconnect supply of driving power from the transmission (120) to the driveshaft (138).

3. The power transfer unit (200) of claim 2, wherein the first clutch (212) is a dog clutch.

4. The power transfer unit (200) of claim 2, wherein the first clutch (212) is a synchronizer clutch.

5. The power transfer unit (200) of claim 2, wherein the first clutch (212) is hydraulically actuated using the hydraulic fluid from the pump (124).

6. The power transfer unit (200) of claim 2, wherein the first clutch (212) is moveable between a connected position in which driving power is transferred from the transmission (120) to the driveshaft (138) and a disconnected position in which driving power is not transferred from the transmission (120) to the driveshaft (138).

7. The power transfer unit (200) of claim 1, wherein the pump (124) and the sump (127) are disposed within the transmission (120).

8. The power transfer unit (200) of claim 1, wherein the engine (110) is transversely mounted in a front-engine configuration.

9. The power transfer unit (200) of claim 1, wherein the transmission (120) is a transaxle that includes a front differential (122) that delivers driving power to a pair of front wheels (130, 132).

10. The power transfer unit (200) of claim 9, wherein the driveshaft (138) is connected to a rear differential gear set (142) that delivers driving power to a pair of rear wheels (150, 152).

11. The power transfer unit (200) of claim 10, wherein the engine (110) is an internal combustion engine.

12. A power transfer unit (200) for an all-wheel drive drivetrain (100) that includes an engine (110), a transmission (120) having a pump (124) for circulating hydraulic fluid from a sump (127), and a driveshaft (138), the power transfer unit (200) comprising:
   an input (210) for receiving driving power from the transmission (120);
   an output (250) for delivering driving power to the driveshaft (138);
   a first clutch (212);
   a first fluid supply path (214) for delivering the hydraulic fluid from the pump (124) to the first clutch (212);
   a fluid return path (205) for returning the hydraulic fluid from the power transfer unit (200) to the sump (127) of the transmission (120);
   a second clutch (240) that controls a ratio of front-to-rear power distribution; and
   a second fluid supply path (245) for delivering the hydraulic fluid from the pump (124) to the second clutch (240), wherein the second clutch (240) is hydraulically actuated using the hydraulic fluid from the pump (124).

13. A drivetrain (100) for an all-wheel drive vehicle, comprising:
   an internal combustion engine (110);
   a transmission (120) having a pump (124) for circulating hydraulic fluid from a sump (127), wherein the pump (124) and the sump (127) are disposed within the transmission (120) and the transmission (120) is a transaxle that includes a front differential (122) that delivers driving power to a pair of front wheels (130, 132);
   a driveshaft (138);
   a rear differential gear set (142) that is connected to the driveshaft (138) and delivers driving power to a pair of rear wheels (150, 152);
   a power transfer unit (200) that includes a first clutch (212) for disconnecting supply of driving power from the transmission (120) to the driveshaft (138) and a second clutch (240) that controls a ratio of front-to-rear power distribution, wherein the first clutch (212) and the second clutch (240) are each hydraulically actuated using the hydraulic fluid from the pump (124);
   a first fluid supply path (214) for delivering the hydraulic fluid to the first clutch (212) of the power transfer unit (200);
   a second fluid supply path (245) for delivering the hydraulic fluid from the pump (124) to the second clutch (240) of the power transfer unit (200); and
   a fluid return path (205) for returning the hydraulic fluid from the power transfer unit (200) to the sump (127).

\* \* \* \* \*